(12) United States Patent
Finner et al.

(10) Patent No.: US 7,188,903 B2
(45) Date of Patent: Mar. 13, 2007

(54) FITTING FOR A VEHICLE SEAT

(75) Inventors: Holger Finner, Hückeswagen (DE); Andreas Vedder, Solingen (DE); Grit Scholz, Remscheid (DE); Heinrich Busch, Remscheid (DE); Ulrich Lehmann, Alfter-Bonn (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 39 days.

(21) Appl. No.: 11/108,041

(22) Filed: Apr. 15, 2005

(65) Prior Publication Data

US 2005/0179297 A1 Aug. 18, 2005

Related U.S. Application Data

(60) Division of application No. 10/458,618, filed on Jun. 10, 2003, now Pat. No. 6,918,635, which is a continuation of application No. PCT/EP02/09534, filed on Aug. 27, 2002.

(30) Foreign Application Priority Data

Sep. 6, 2001 (DE) .................................. 101 44 840
Jan. 26, 2002 (DE) .................................. 102 03 006

(51) Int. Cl.
*B60N 2/22* (2006.01)
(52) U.S. Cl. ...................................................... 297/362
(58) Field of Classification Search ................ 297/362; 475/162, 180
See application file for complete search history.

(56) References Cited

U.S. PATENT DOCUMENTS

| 3,171,699 A | 3/1965 | Maxey |
| 4,371,207 A | 2/1983 | Wilking et al. |
| 4,439,053 A | 3/1984 | Pelz |
| 4,582,360 A | 4/1986 | Becker |
| 5,154,475 A | 10/1992 | Kafitz |
| 5,277,672 A | 1/1994 | Droulon et al. |
| 5,524,970 A | 6/1996 | Kienke et al. |
| 5,634,380 A | 6/1997 | Scholz et al. |
| 5,634,689 A | 6/1997 | Putsch et al. |
| 5,810,442 A | 9/1998 | Ito et al. |
| 5,871,414 A | 2/1999 | Voss et al. |
| 6,305,748 B1 | 10/2001 | Ohba |

(Continued)

FOREIGN PATENT DOCUMENTS

DE 39 41 215 A1 6/1991

(Continued)

*Primary Examiner*—Joseph Edell
(74) *Attorney, Agent, or Firm*—Womble Carlyle Sandridge & Rice, PLLC (57) ABSTRACT

In the case of a fitting for a vehicle seat, in particular for a motor vehicle seat, having a first fitting part (11), a second fitting part (12) connected by a gear mechanism to the first fitting part (11), a driving ring (26), which at least partially defines an eccentric (27, 29) and is mounted rotatably in the first fitting part, for driving a rolling movement of the second fitting part (12) on the first fitting part (11), and a drivable driving bushing (21) which is mounted rotatably, the driving bushing (21) and the driving ring (26) are connected to each other in a form-fitting manner by a transmission profile (24', 26').

25 Claims, 4 Drawing Sheets

U.S. PATENT DOCUMENTS

| | | |
|---|---|---|
| 6,318,806 B1 | 11/2001 | Levert et al. |
| 6,619,743 B1 | 9/2003 | Scholz et al. |
| 6,637,821 B2 | 10/2003 | Lee et al. |

FOREIGN PATENT DOCUMENTS

| | | |
|---|---|---|
| DE | 40 07 023 A1 | 9/1991 |
| DE | 195 27 374 A1 | 1/1997 |
| DE | 195 33 453 A1 | 3/1997 |
| DE | 197 16 813 A1 | 10/1998 |
| DE | 195 48 809 C1 | 2/1999 |
| DE | 199 56 984 A1 | 6/2000 |
| DE | 199 38 666 A1 | 2/2001 |
| DE | 199 61 639 A1 | 10/2001 |
| FR | 2 656 392 | 6/1991 |
| FR | 2 806 980 | 10/2001 |
| GB | 2 107 386 A | 4/1983 |

FITTING FOR A VEHICLE SEAT

CROSS-REFERENCE TO RELATED APPLICATIONS

The present application is a division of application Ser. No. 10/458,618, filed Jun. 10, 2003, and issued as U.S. Pat. No. 6,918,635, which is a continuation of International Application No. PCT/EP/02/09534, filed Aug. 27, 2002. Each of application Ser. No. 10/458,618, filed Jun. 10, 1993, and International Application No. PCT/EP/02/09534, filed Aug. 27, 2002, is incorporated herein by reference, in its entirety.

BACKGROUND OF THE INVENTION

The present invention relates to a fitting for a vehicle seat, in particular for a motor vehicle seat, having a first fitting part, a second fitting part connected by a gear mechanism to the first fitting part, a driving ring, which at least partially defines an eccentric and is mounted rotatably in the first fitting part, for driving a rolling movement of the second fitting part on the first fitting part, and a rotatably mounted, drivable driving bushing for rotating the driving ring.

DE 199 38 666 A1 discloses a fitting of this type, in which the driver necessary for the drive is of two-part design in the form of a driving bushing and a driving ring, in order to reduce a functionally induced backlash during reversal of direction. The driving bushing and driving ring are connected to each other in a rotationally fixed manner via two lugs and a cutout. When the fitting is adjusted by motor, there is, however, the problem that undesirable, high loads occur in the fitting, particularly when approaching the end stop.

BRIEF SUMMARY OF THE INVENTION

One aspect of the present invention is based on the object of improving a fitting of the type mentioned above, in particular reducing the peak loads. In accordance with this aspect, a fitting for a vehicle seat, in particular for a motor vehicle seat, has a first fitting part, a second fitting part connected by a gear mechanism to the first fitting part, a driving ring, which at least partially defines an eccentric and is mounted rotatably in the first fitting part, for driving a rolling movement of the second fitting part on the first fitting part, and a rotatably mounted, drivable driving bushing for rotating the driving ring, wherein the driving bushing and the driving ring are connected to each other in a form-fitting manner by a transmission profile.

The fact that the driving bushing and the driving ring are connected to each other in a form-fitting manner by a transmission profile means that relatively high loads can be transmitted via this connection. This improves the possibility of using the fitting as a motor-adjustable fitting and reduces the peak load on the individual components. The fitting is designed in such a manner that it is more efficient under load than without a load. In the case of two fittings according to the invention having a common drive shaft, reliable synchronization is possible when the drive shaft is installed.

In addition, the form-fitting transmission profile of the driving bushing and driving ring, on the one hand, and the eccentric, on the other hand, is preferably arranged in the same plane, thus enabling a higher driving torque to be transmitted by avoiding multiaxial stress states. This also improves the possibility of using the fitting as a motor-adjustable fitting. Because of the improved load transmission with the form-fitting engagement between the driving bushing and driving ring, a preferred formation of the driving bushing from plastic is possible, which permits more complex geometries and reduces the production costs.

In order to compensate for tolerances between the driving bushing and driving ring, the material of the transmission profile of the driving bushing can preferably be displaced during the installation. For the axial securing of the eccentric, cams are preferably provided on the driving bushing, with the cams bearing against the eccentric.

High peak loads occur not only because of the known transmission between the driving bushing and driving ring, but also in the case of a not quite uniform rolling movement, for example due to a sliding-bearing bushing not quite being round.

Because an elastic element, which is effective in the radial direction, is provided in the region of the sliding bearing, it is possible for torque peaks, which occur during no-load operation when passing through narrow points, to be reduced, with the result that the peak load on the individual components is reduced. In this case, the self-locking condition of the fitting, the controlling behavior of the wedges and the play-free setting are not changed, and, on the contrary, the service life is extended in terms of wear. The elastic element may additionally also act as a damping element.

The elastic element, which is preferably provided with an annular basic shape, is preferably arranged at a point where there is no relative movement during the adjustment of the fitting, for example directly between the sliding bearing and the second fitting part, or, in order to simplify the installation, between a bushing or a receptacle, on the one hand, and the sliding bearing, on the other hand. A design made of plastic affords the advantages of simple production and specific adjustability of the properties. The elastic element may also be formed from spring steel sheet and may, for example, have a corrugated shape in the circumferential direction. The receptacle or the spring steel sheet can transform into a block in the event of a crash, i.e. the effect of the elastic element can be neutralized.

The fitting according to the invention is preferably designed for a motor drive, but it may also be driven manually. The invention can also be used in other gear-type fittings which are driven by motor or manually, irrespective of whether an eccentric made from wedges or a substantially rigid eccentric is provided.

BRIEF DESCRIPTION OF THE DRAWINGS

The invention is explained in greater detail below with reference to three exemplary embodiments, together with modifications, which are illustrated in the drawings, in which.

DETAILED DESCRIPTION OF THE INVENTION

In the first exemplary embodiment, a vehicle seat 1 (which is partially and schematically illustrated in FIG. 2) for a motor vehicle has a seat part 3 and a backrest 4 which can be adjusted in its inclination relative to the seat part 3 by an electric motor 5. The motor 5 is fitted on the structure of the backrest 4 and functions as a drive for the inclination adjustment. The electric motor 5 rotates a drive shaft 7 which is arranged horizontally in the transition region between the seat part 3 and backrest 4. On both sides of the vehicle seat 1, the drive shaft 7 engages (in a way which is described below) in a rotationally fixed manner in a fitting 10.

Figure 1:
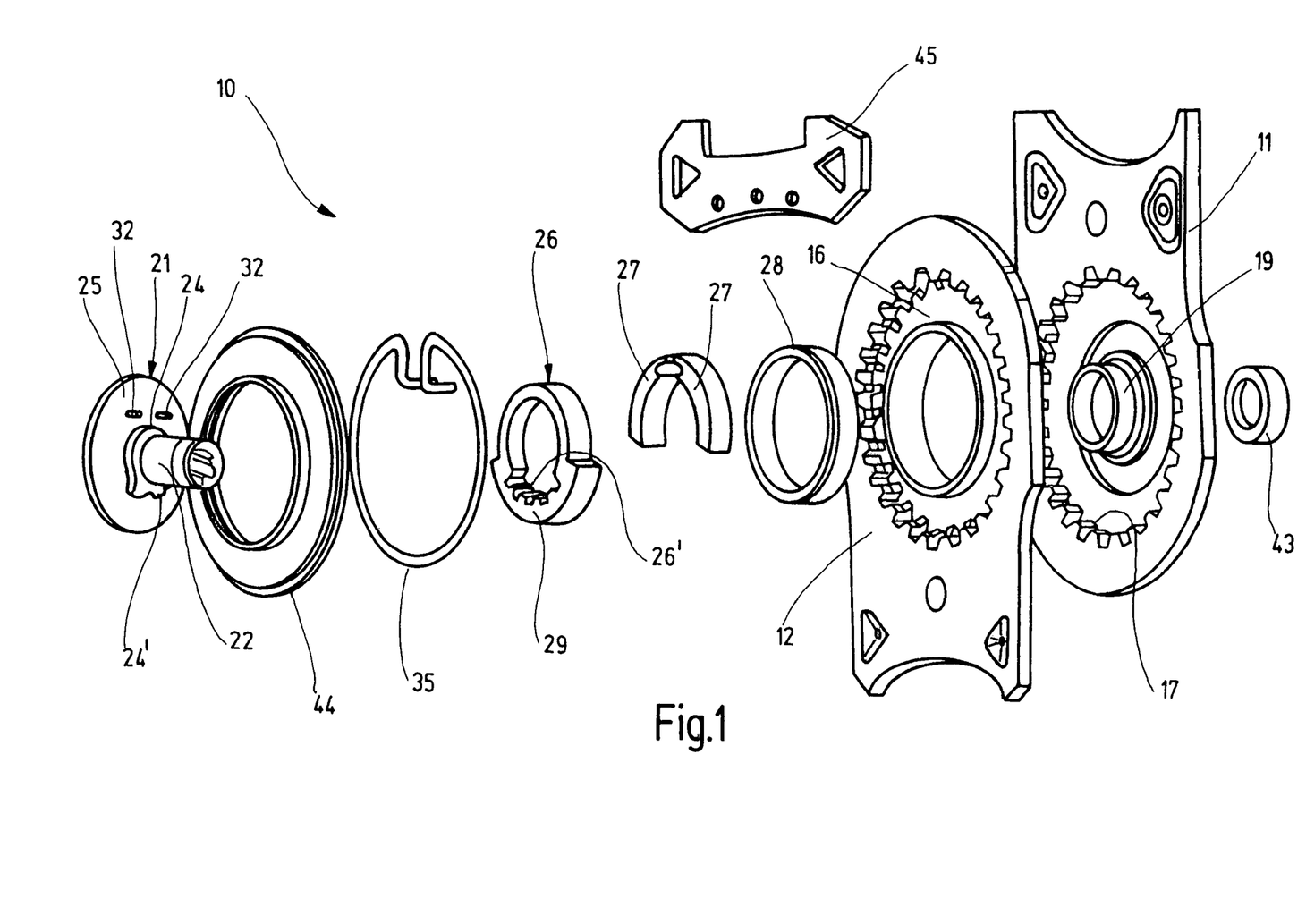
FIG. 1 shows an exploded illustration of the first exemplary embodiment, with the driving bushing being illustrated from a different viewing direction.
Figures 2, 3, 4:
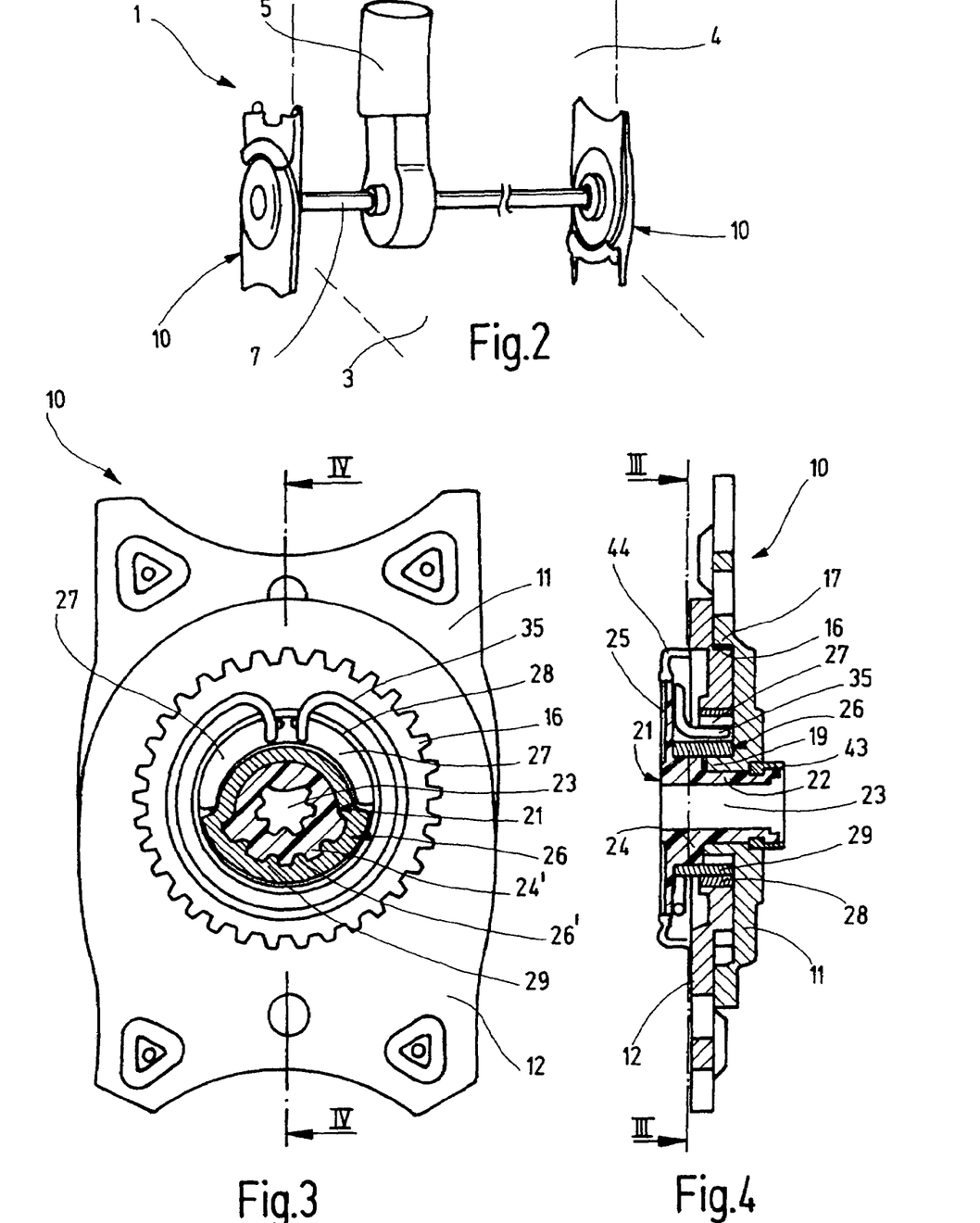
FIG. 2 shows a diagrammatic illustration of a vehicle seat having two fittings according to the invention.
FIG. 3 shows a radial section through the first exemplary embodiment along the line III—III in FIG. 4.
FIG. 4 shows an axial section through the first exemplary embodiment along the line IV—IV in FIG. 3.

The fitting 10 is designed as a tumbling fitting, in which a first fitting part 11 and a second fitting part 12 are connected to each other for adjustment and fixing purposes via a gear mechanism. The two fitting parts 11 and 12 have an essentially flat shape and consist of steel. The first fitting part 11 is connected fixedly to the structure bearing the driving electric motor 5 (in the present case the structure of the backrest 4), for which reason, in the exemplary embodiment, the first component 11 is fixed on the backrest and is therefore illustrated at the top in the drawings. Correspondingly, in the exemplary embodiment, the second fitting part 12 is fixed on the seat part and is illustrated at the bottom in the drawings. In the case of a different arrangement of the electric motor 5 and with manually driven fittings, the positions of the fitting parts 11 and 12 can be interchanged.

In order to form the gear mechanism, a toothed wheel 16 having external teeth is embossed on the second fitting part 12, and a toothed ring 17 having internal teeth is embossed on the first fitting part 11, with the toothed wheel and toothed ring intermeshing. The diameter of the outside circle of the external teeth of the toothed wheel 16 is smaller by at least one tooth height than the diameter of the root circle of the internal teeth of the toothed ring 17. The corresponding difference between the number of teeth of the toothed wheel 16 and toothed ring 17 enables the toothed ring 17 to roll on the toothed wheel 16.

The first fitting part 11 has, concentrically with the internal teeth of the toothed ring 17, an integrally formed collar-type connection 19 on the side facing the toothed wheel 16. A driving bushing 21 is mounted with play in the collar-type connection 19 by means of a hub 22. The driving bushing 21, which consists of plastic, is provided in the center with a hole 23 matching the profile of the external spines of the drive shaft 7. After its hub 22, the driving bushing 21 has a gradation 24 having a larger diameter than the hub 22 followed by a covering disk 25 having a larger diameter than the gradation 24.

Over part of its circumference, over approximately less than half in the exemplary embodiment, the gradation 24 has a radially outwardly directed external teeth 24', with five teeth in the exemplary embodiment. In the region of the external teeth 24', the gradation 24 holds a driving ring 26 which is made from steel and in some regions has internal teeth 26' which engage completely and in a form-fitting manner in the external teeth 24'. Instead of the teeth, other form-fitting transmission profiles having ribs, polygonal connections or the like are also possible. In order to eliminate play in the form-fitting connection between the internal teeth 26' and external teeth 24', the form-fitting engagement can take place with displacement of material of the gradation 24 during the installation.

Two wedge segments 27 are supported on the driving ring 26, with the wedge segments supporting, by way of their curved outer surfaces, a sliding bearing bushing 28 which is pressed in a rotationally fixed manner into the second fitting part 12. The driving ring 26 has a driving segment 29 which is held with play between the narrow sides of the wedge segments 27 and bears the internal teeth 26' on its radially inwardly facing side. The driving segment 29, the gradation 24 of the driving bushing 21 and a section of the hole 23 together with the drive shaft 7 therefore lie in one plane, which avoids multiaxial stress states. Integrally formed on the inwardly facing side of the covering disk 25 of the driving bushing 21 are two protruding studs 32 or, in general, cams which bear with their ends in each case against one of the two wedge segments 27 and secure said segment in the axial direction.

The mutually facing wide sides of the wedge segments 27 in each case accommodate, by means of a respective recess defined by projecting sections of material, an angled end finger of an annular spring 35 which pushes the wedge segments 27 apart in the circumferential direction. Accordingly, it is possible, in the event of a blockage of the wedge segments 27 during operation or the backrest 4 running up against a load, for the radially outer, projecting sections of material to come into contact with one another and act upon one another.

The driving bushing 21 is secured axially on the outside of the first fitting part 11 by way of a clipped-on snap ring 43. A sealing ring 44 is provided on the outside of the second fitting part 12, between the embossing for the toothed wheel 16 and the covering disk 25 of the driving bushing 21. In order to absorb the axially acting forces, a respective retaining plate 45 is welded on the two fitting parts 11 and 12, with the retaining plate engaging over the respectively other fitting part without obstructing the adjusting movement. For the sake of clarity, only one of these retaining plates 45 is illustrated in FIG. 1.

The driving ring 26 and the wedge segments 27 define an eccentric which, as an extension of the direction of the eccentricity, presses the toothed wheel 16 into the toothed ring 17 at an engagement point defined in this manner. During driving by way of the rotating drive shaft 7, a torque is initially transmitted to the driving bushing 21 and then to the thus defined eccentric which slides along the sliding bearing bushing 28 displacing the direction of the eccentricity and therefore displacing the engagement point of the toothed wheel 16 in the toothed ring 17, which provides a tumbling rolling movement.

The second exemplary embodiment is largely identical to the first exemplary embodiment, for which reason components which are identical and act in an identical manner bear reference numbers which are incremented by 100.

Figure 12:
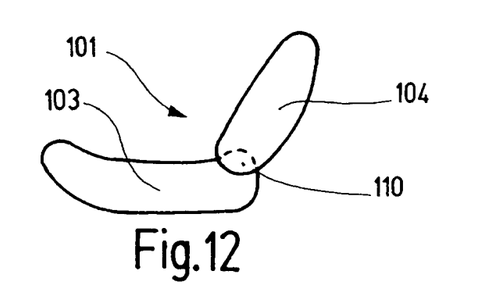
FIG. 12 shows a diagrammatic illustration of a vehicle seat.

A vehicle seat 101 (schematically illustrated in FIG. 12) for a motor vehicle has a seat part 103 and a backrest 104 which can be adjusted in its inclination relative to the seat part 103. An electric motor, which is fitted on the structure of the backrest 104, is provided as a drive for the inclination adjustment. The electric motor rotates a drive shaft 107 which is arranged horizontally in the transition region between the seat part 103 and backrest 104. On both sides of the vehicle seat 101, the drive shaft 107 engages (in a way which is described further on) in a rotationally fixed manner in a fitting 110.

Figures 5, 6:
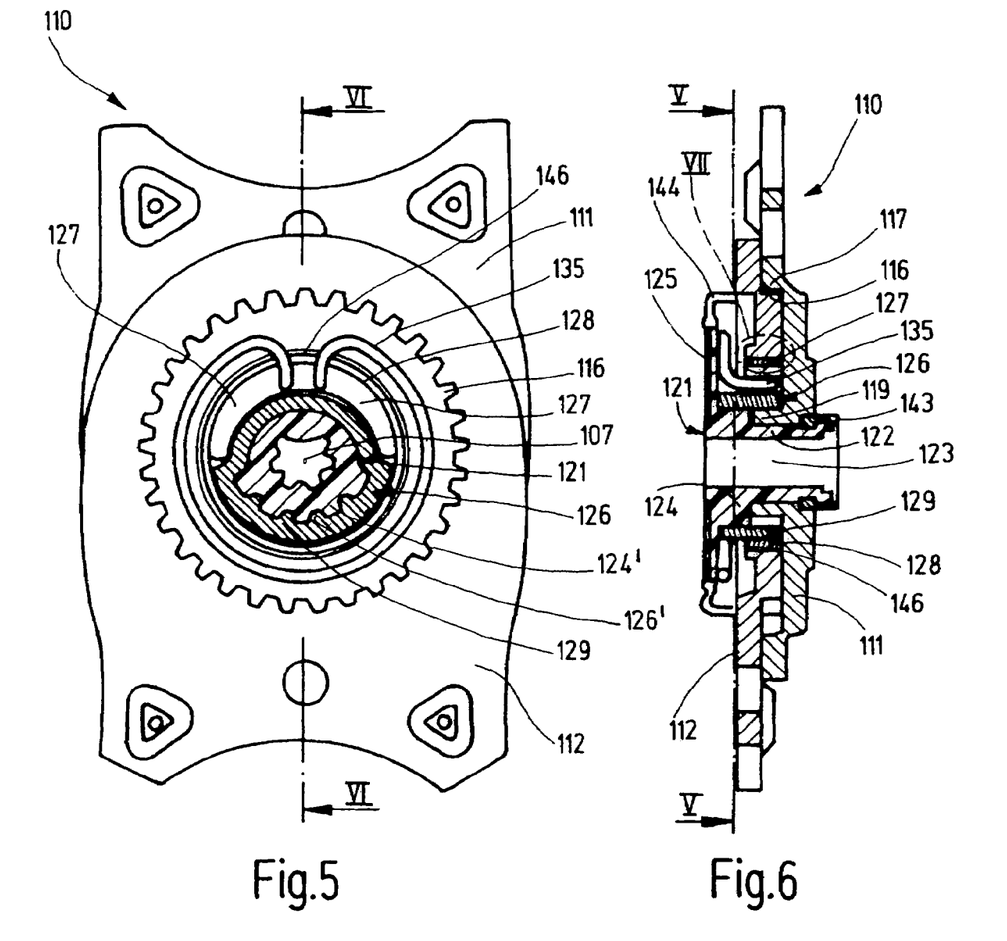
FIG. 5 shows a radial section through the second exemplary embodiment along the line V—V in FIG. 6.
FIG. 6 shows an axial section through the second exemplary embodiment along the line VI—VI in FIG. 5.

The fitting 110 is designed as a tumbling fitting, in which a first fitting part 111 and a second fitting part 112 are connected to each other for adjustment and fixing purposes via a gear mechanism. The two fitting parts 111 and 112 have an essentially flat shape and consist of steel. The first fitting part 111 is connected fixedly to the structure bearing the driving electric motor (in the present case thus the structure of the backrest 104), for which reason, in the exemplary embodiment, the first component 111 is fixed on the backrest and is therefore illustrated at the top in the drawing. Correspondingly, in the exemplary embodiment, the second fitting part 112 is fixed on the seat part and is illustrated at the bottom in the drawing. In the case of a different arrangement of the electric motor and with manually driven fittings, the positions of the fitting parts 111 and 112 can be interchanged.

In order to form the gear mechanism, a toothed wheel 116 having external teeth is embossed on the second fitting part 112 and a toothed ring 117 having internal teeth is embossed on the first fitting part 111, with the toothed wheel and toothed ring intermeshing. The diameter of the outside circle of the external teeth of the toothed wheel 116 is smaller by at least one tooth height than the diameter of the root circle of the internal teeth of the toothed ring 117. Because of the difference in the number of teeth between the toothed wheel 116 and toothed ring 117, the toothed ring 117 rolls on the toothed wheel 116.

The first fitting part 111 has, concentrically with the internal teeth of the toothed ring 117, an integrally formed collar-type connection 119 on the side facing the toothed wheel 116. A driving bushing 121 made of plastic is provided with a hub 122, which is arranged within the collar-type connection 119, and is provided in the center with a hole 123 matching the profile of the external spines of the drive shaft 107. After its hub 122, the driving bushing 121 has a gradation 124 having a larger diameter than the hub 122, followed by a covering disk 125 having a larger diameter than the gradation 124.

In the region of its gradation 124, the driving bushing 121 is held by a driving ring 126 which is made of steel, is mounted on the collar-type connection 119 and in some regions has an internal teeth 126' which engages completely and in a form-fitting manner in a corresponding external teeth 124' of the gradation 124, which teeth acts as a transmission profile. As in the first exemplary embodiment, other form-fitting transmission profiles are also possible. A displacement of the material during the installation may also be provided.

Two wedge segments 127 are supported on the driving ring 126, with the wedge segments supporting, by means of their curved outer surfaces, a sliding bearing bushing 128 which is fitted on the second fitting part 112 in a manner described further on. The driving ring 126 has a driving segment 129 which is held with play between the narrow sides of the wedge segments 127 and bears the internal teeth mentioned on its radially inwardly facing side. The driving segment 129, the gradation 124 of the driving bushing 121 and a section of the hole 123 together with the drive shaft 107 therefore lie in one plane. Integrally formed on the inwardly facing side of the covering disk 125 of the driving bushing 121, in accordance with the second exemplary embodiment, are two cams or the like which bear with their ends in each case against one of the two wedge segments 127 and secure the segment in the axial direction.

The mutually facing wide sides of the wedge segments 127 in each case accommodate, by way of a respective recess defined by projecting sections of material, an angled end finger of an annular spring 135 which pushes the wedge segments 127 apart in the circumferential direction. Accordingly, it is possible, in the event of the backrest 104 running up against a load, for the radially outer, projecting sections of material to come into contact with one another and act upon one another.

The driving bushing 121 is secured axially on the outside of the first fitting part 111 by way of a clipped-on snap ring 143. A sealing ring 144 is provided on the outside of the second fitting part 112, between the embossing for the toothed wheel 116 and the covering disk 125 of the driving bushing 121. In order to absorb the axially acting forces, a respective retaining plate is welded on the two fitting parts 111 and 112, with the retaining plate engaging over the respectively other fitting part without obstructing the adjusting movement.

The driving ring 126 and the wedge segments 127 define an eccentric which, as an extension of the direction of the eccentricity, presses the toothed wheel 116 into the toothed ring 117 at an engagement point defined in this manner. During driving by way of the rotating drive shaft 107, a torque is initially transmitted to the driving bushing 121 and then to the thus defined eccentric which slides along the sliding bearing bushing 128 displacing the direction of the eccentricity and therefore displacing the engagement point of the toothed wheel 116 in the toothed ring 117, which provides a tumbling rolling movement.

Figure 7:
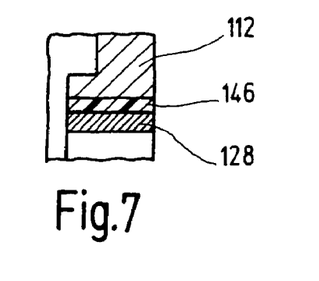
FIG. 7 shows a partial section of the second exemplary embodiment in the region VII of FIG. 6.

According to the invention, the sliding bearing bushing 128 is placed into the second fitting part 112 with the interposition of an annular, elastic element 146 made of plastic, with these three components normally remaining arranged in a rotationally fixed manner with respect to one another. The sliding bearing bushing 128 is thus substantially spring-mounted in the radial direction. When the fitting 110 is actuated in the unloaded state, a frictionally induced carrying-along of the wedge segments 127 by the driving ring 126 (instead of the wedge segments 127 bearing against each other) can give rise, at narrow points (ovalities), to torque peaks which are reduced by the elastic element 146, with, depending on the selection of the material for the elastic element 146, the energy which is absorbed being completely returned again or else partially dissipated, i.e. damped. The elastic element 146 may also be injected between the sliding bearing bushing 128 and the second fitting part 112.

Figure 8:
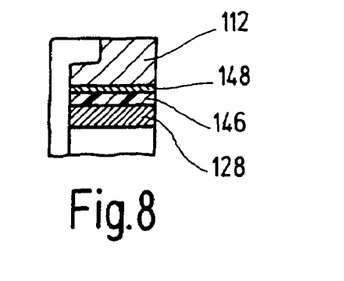
FIG. 8 shows a partial section corresponding to FIG. 7 according to a first modification.

In a first modified embodiment, in order to simplify the installation, the sliding bearing bushing 128 together with the elastic element 146 are prefitted within a bushing 148 made of steel, or the elastic element 146 is injected between the sliding bearing bushing 128 and the bushing 148, and then this subassembly is pressed into the second fitting part 112.

Figure 9:
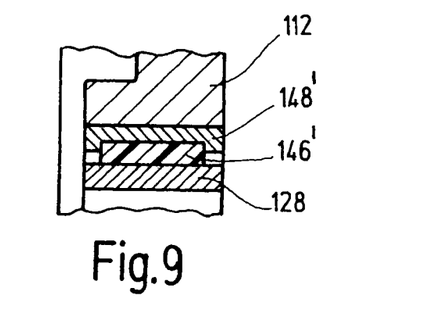
FIG. 9 shows a partial section corresponding to FIG. 7 according to a second modification.

In a second modified embodiment, this bushing is designed as a receptacle 148' with the elastic element 146' inserted between its edge regions, which are bent at right angles, and fitted on the sliding bearing bushing 128, it also being possible here for the elastic element 146' to be injected between the sliding bearing bushing 128 and receptacle 148'. As in the case of the first modification, this prefitted subassembly is pressed into the second fitting part 112. In the event of a crash, the edge regions of the receptacle 148' are pressed together with the sliding bearing bushing 128 to form a block, with the result that the effect of the elastic element 146' is neutralized.

Figure 10:
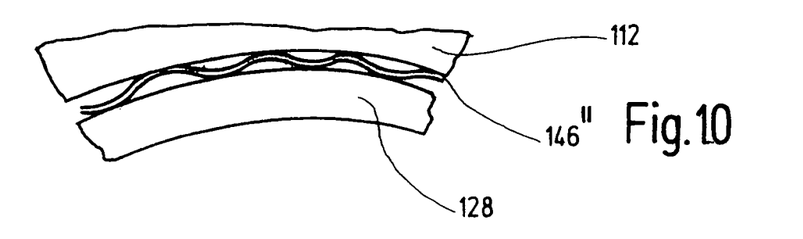
FIG. 10 shows a partial view according to a third modification.

In a third modified embodiment, the elastic element 146" consists of steel spring sheet with an annular basic shape and has, along its circumference, a corrugated shape which can be used to absorb the radially effective forces. In the event of a crash, this steel spring sheet is also pressed in a block, i.e. the elasticity is likewise removed.

Figure 11:
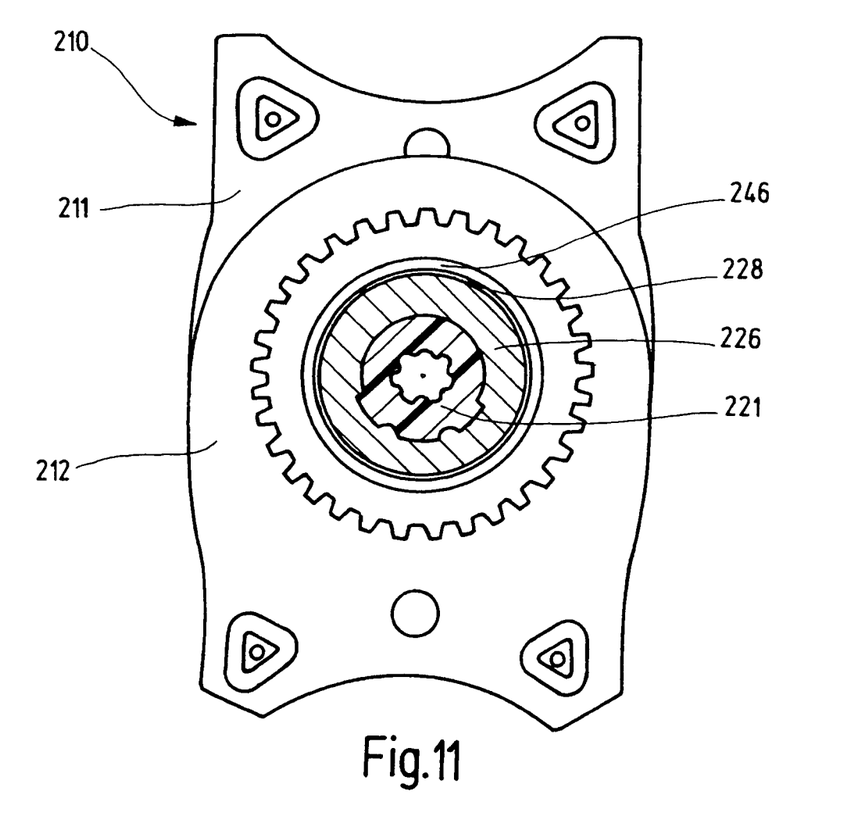
FIG. 11 shows a radial section through the third exemplary embodiment corresponding to FIG. 5.

The third exemplary embodiment largely corresponds to the second exemplary embodiment, for which reason components which are identical and act in an identical manner bear reference numbers incremented by 100. Instead of the eccentric composed of a driving ring and wedge segments, the fitting 210 has a single-piece substantially rigid eccentric 226 which is rotated by the driving bushing 221, which is mounted in the first fitting part 211, and rotates in the sliding bearing bushing 228. The sliding bearing bushing 228 is mounted in turn in the second fitting part 212 with the interposition of an elastic element 246. The damping element 246 is used for the complete play-free setting of the fitting 210, which is provided without a wedge and spring system.

What is claimed is:

1. A fitting for a vehicle seat, comprising:
   (a) first and second fitting parts that are connected to one another by a gear mechanism so that there can be a rolling movement of the second fitting part on the first fitting part, wherein
      (1) the second fitting part includes an opening, and
      (2) the first fitting part includes an opening;
   (b) a driving ring rotatably mounted in the first fitting part and positioned in the opening of the second fitting part, wherein
      (1) the driving ring at least partially defines an eccentric arranged so that rotation of the driving ring causes the rolling movement of the second fitting part on the first fitting part,
      (2) the driving ring includes a first transmission profile and an opening,
      (3) the first transmission profile includes internal teeth; and
   (c) a rotatably mounted driving bushing that is positioned in both the opening of the driving ring and the opening of the first fitting part, wherein
      (1) the driving bushing includes a second transmission profile, and an inner surface that extends around an opening of the driving bushing and defines a third transmission profile,
      (2) the second transmission profile includes external teeth that are mated with the internal teeth of the driving ring in a form-fitting manner so that the driving bushing and the driving ring are connected to one another, and rotation of the driving bushing causes rotation of the driving ring and thereby the rolling movement of the second fitting part on the first fitting part,
      (3) the driving bushing is distinct from the driving ring,
      (4) the driving bushing includes a hub, a gradation, and a flange,
      (5) the gradation extends farther radially outward than the hub,
      (6) the flange extends farther radially outward than the gradation, and
      (7) the external teeth are contiguous with, and extend radially outward from, the gradation.

2. The fitting according to claim 1, wherein the gradation, the internal teeth, the external teeth and the eccentric are all arranged in a common plane.

3. The fitting according to claim 1, wherein:
   the flange comprises a disk, and
   the gradation's diameter is larger than the hub's diameter and smaller than the disk's diameter.

4. The fitting according to claim 1, wherein the gradation includes an arcuate, circumferential, outer surface.

5. The fitting according to claim 4, wherein:
   the hub includes an arcuate, circumferential, outer surface, and
   the gradation includes a shoulder that extends radially between the outer surface of the hub and the outer surface of the gradation.

6. The fitting according to claim 1, wherein the gradation is positioned in the opening of the driving ring.

7. The fitting according to claim 6, wherein the hub is positioned in the opening of the first fitting part.

8. The fitting according to claim 6, wherein:
   the driving ring includes an arcuate, circumferential, inner surface that at least partially defines the opening of the driving ring, and
   the gradation includes an arcuate, circumferential, outer surface that is in opposing face-to-face relationship with the inner surface of the driving ring.

9. The fitting according to claim 1, wherein the external teeth includes more than two teeth.

10. The fitting according to claim 1, wherein the internal teeth includes more than two teeth.

11. The fitting according to claim 1, wherein the driving bushing includes at least one cam that is discrete from the external teeth.

12. The fitting according to claim 1, wherein the eccentric comprises a driving segment of the driving ring and wedge segments which are clamped against each other.

13. The fitting according to claim 1, wherein the opening of the driving bushing and the third transmission profile are cooperative for holding, in a rotationally fixed manner, a motor-driven drive shaft.

14. The fitting according to claim 1 in combination with a drive shaft, wherein the drive shaft extends into the opening of the driving bushing and engages the third transmission profile in a maimer such that the drive shaft is for rotating the driving bushing.

15. The combination according to claim 14 and further in combination with the vehicle seat, with the first fitting part mounted to a first part of the vehicle seat and the second fitting part mounted to a second part of the vehicle seat, so that the fitting is for causing relative movement between the first and second parts of the vehicle seat in response to rotation of the drive shaft.

16. The fitting according to claim 1, wherein:
   the driving ring includes an arcuate, circumferential, inner surface that at least partially defines the opening of the driving ring, and extends at least partially around the driving ring's axis of rotation;
   the inner surface of the driving ring includes opposite ends;
   the first transmission profile further includes
      (a) a first slot for receiving at least one tooth of the external teeth of the driving bushing, wherein the first slot is adjacent a first of the opposite ends of the inner surface of the driving ring, and (b) a second slot for receiving at least one tooth of the external teeth of the driving bushing, wherein the second slot is adjacent a second of the opposite ends of the inner surface of the driving ring; and the internal teeth of the driving ring are positioned between the first slot and the second slot.

17. The fitting according to claim 16, wherein:

the first slot is partially defined by a first tooth of the internal teeth of the driving ring, and the second slot is partially defined by a second tooth of the internal teeth of the driving ring.

18. The fitting according to claim 1, wherein the driving bushing is formed from plastic, and the driving ring is formed of metal.

19. The fitting according to claim 1, wherein material of the external teeth of the driving bushing can be displaced during the installation of the driving bushing and the driving ring with respect to one another.

20. The fitting according to claim 1, wherein the internal teeth and the external teeth extend only partially around respective circumferences of the driving ring and the driving bushing.

21. A fitting for a vehicle seat, comprising:
(a) first and second fitting parts that are connected to one another by a gear mechanism so that there can be a rolling movement of the second fitting part on the first fitting part, wherein
  (1) the second fitting part includes an opening, and
  (2) the first fitting part includes an opening;
(b) a driving ring rotatably mounted in the first fitting part and positioned in the opening of the second fitting part, wherein
  (1) the driving ring at least partially defines an eccentric arranged so that rotation of the driving ring causes the rolling movement of the second fitting part on the first fitting part,
  (2) the driving ring includes a first transmission profile and an opening.
  (3) the first transmission profile includes internal teeth; and
(c) a rotatably mounted driving bushing that is positioned in both the opening of the driving ring and the opening of the first fitting part, wherein
  (1) the driving bushing includes a second transmission profile, and an inner surface that extends around an opening of the driving bushing and defines a third transmission profile,
  (2) the second transmission profile includes external teeth that are mated with the internal teeth of the driving ring in a form-fitting manner so that the driving bushing and the driving ring are connected to one another, and rotation of the driving bushing causes rotation of the driving ring and thereby the rolling movement of the second fitting part on the first fitting part,
  (3) the driving bushing is distinct from the driving ring,
  (4) the driving bushing includes at least one cam that is discrete from the external teeth,
  (5) the eccentric includes at least one wedge segment, and
  (6) the cam engages the wedge segment and thereby axially secures the wedge segment.

22. The fitting according to claim 21, wherein:

the driving bushing includes a hub, a gradation, and a flange, the gradation extends farther radially outward than the hub, the flange extends farther radially outward than the gradation, and the external teeth are contiguous with, and extend radially outward from, the gradation.

23. A fitting for a vehicle seat, comprising:
(a) first and second fitting parts that are connected to one another by a gear mechanism so that there can be a rolling movement of the second fitting part on the first fitting part, wherein
  (1) the second fitting part includes an opening, and
  (2) the first fitting part includes an opening;
(b) a driving ring rotatably mounted in the first fitting part and positioned in the opening of the second fitting part, wherein
  (1) the driving ring at least partially defines an eccentric arranged so that rotation of the driving ring causes the rolling movement of the second fitting part on the first fitting part,
  (2) the driving ring includes a first transmission profile and an opening,
  (3) the first transmission profile includes internal teeth; and
(c) a rotatably mounted driving bushing that is positioned in both the opening of the driving ring and the opening of the first fitting part, wherein
  (1) the driving bushing includes a second transmission profile, and an inner surface that extends around an opening of the driving bushing and defines a third transmission profile,
  (2) the second transmission profile includes external teeth that are mated with the internal teeth of the driving ring in a form-fitting manner so that the driving bushing and the driving ring are connected to one another, and rotation of the driving bushing causes rotation of the driving ring and thereby the rolling movement of the second fitting part on the first fitting part,
  (3) the driving bushing is distinct from the driving ring,
  (4) the eccentric comprises a driving segment of the driving ring and wedge segments which are clamped against each other,
  (5) the driving bushing has cams for respectively engaging the wedge segments and thereby axially securing the wedge segments.

24. The fitting according to claim 23 wherein:

the driving bushing includes a hub, a gradation, and a disk, the gradation's diameter is larger than the hub's diameter and smaller than the disk's diameter, the external teeth protrude radially from the gradation, and the cams protrude axially from the disk.

25. A fitting for a vehicle seat, comprising:
(a) first and second fitting parts that are connected to one another by a gear mechanism so that there can be a rolling movement of the second fitting part on the first fitting part, wherein
  (1) the second fitting part includes an opening, and
  (2) the first fitting part includes an opening;
(b) a driving ring rotatably mounted in the first fitting part and positioned in the opening of the second fitting part, wherein
  (1) the driving ring at least partially defines an eccentric arranged so that rotation of the driving ring causes the rolling movement of the second fitting part on the first fitting part, (2) the driving ring includes a first transmission profile and an opening,
(3) the first transmission profile includes internal teeth; and
(c) a rotatably mounted driving bushing that is positioned in both the opening of the driving ring and the opening of the first fitting part, wherein
  (1) the driving bushing includes a second transmission profile, and an inner surface that extends around an opening of the driving bushing and defines a third transmission profile,
  (2) the second transmission profile includes external teeth that are mated with the internal teeth of the driving ring in a form-fitting manner so that the driving bushing and the driving ring are connected to one another, and rotation of the driving bushing causes rotation of the driving ring and thereby the rolling movement of the second fitting part on the first fitting part,
  (3) the driving bushing is distinct from the driving ring,
  (4) the eccentric comprises a driving segment of the driving ring and wedge segments which are clamped against each other,
  (5) the driving bushing includes a hub, a gradation, and a disk,
  (6) the gradation's diameter is larger than the hub's diameter and smaller than the disk's diameter,
  (7) the external teeth protrude radially from the gradation, and
  (8) cams protrude axially from the disk.

* * * * *